(12) United States Patent
Carroll

(10) Patent No.: US 7,561,169 B2
(45) Date of Patent: Jul. 14, 2009

(54) SYSTEMS AND METHODS FOR GENERATING USER SPECIFIED INFORMATION FROM A MAP

(75) Inventor: Brian Carroll, Prince Frederick, MD (US)

(73) Assignee: Geo-Softworks, LLC, Prince Frederick, MD (US)

( * ) Notice: Subject to any disclaimer, the term of this patent is extended or adjusted under 35 U.S.C. 154(b) by 408 days.

(21) Appl. No.: 11/465,987

(22) Filed: Aug. 21, 2006

(65) Prior Publication Data

US 2008/0043037 A1    Feb. 21, 2008

(51) Int. Cl.
| | |
|---|---|
| G06T 11/20 | (2006.01) |
| G09G 5/00 | (2006.01) |
| G06K 9/32 | (2006.01) |
| G06K 9/60 | (2006.01) |
| G08B 1/00 | (2006.01) |
| G08B 1/123 | (2006.01) |
| G01C 21/30 | (2006.01) |
| G01C 1/00 | (2006.01) |
| G06F 3/00 | (2006.01) |
| G06F 3/048 | (2006.01) |

(52) U.S. Cl. ............... 345/619; 345/441; 345/522; 340/995.1; 340/995.14; 340/539.2; 701/4; 701/208; 382/260; 382/305; 715/700; 715/855

(58) Field of Classification Search ............... 340/539.3, 340/990, 995.1, 995.14, 995.24, 539.2; 345/629, 345/441, 594, 619, 650, 443, 468–469, 418, 345/636, 520, 522, 551, 556; 701/117, 119, 701/4, 200, 212, 208–209; 382/305, 295, 382/282, 276, 260, 254; 715/273, 700, 764, 715/855

See application file for complete search history.

(56) References Cited

U.S. PATENT DOCUMENTS

| | | | |
|---|---|---|---|
| 2003/0158668 A1* | 8/2003 | Anderson | 702/5 |
| 2005/0203768 A1* | 9/2005 | Florance et al. | 705/1 |
| 2007/0056340 A1* | 3/2007 | Boyd | 70/408 |
| 2007/0213927 A1* | 9/2007 | Ishigami et al. | 701/207 |
| 2008/0162031 A1* | 7/2008 | Okuyama et al. | 701/200 |
| 2008/0183376 A1* | 7/2008 | Knockeart et al. | 701/119 |
| 2008/0186164 A1* | 8/2008 | Emigh et al. | 340/539.13 |
| 2008/0221785 A1* | 9/2008 | Winberry et al. | 701/200 |

* cited by examiner

*Primary Examiner*—Wesner Sajous
(74) *Attorney, Agent, or Firm*—MH2 Technology Law Group LLP

(57) ABSTRACT

An embodiment relates generally a method of generating user-specified information. The method includes selecting a plurality of points on a map, where the plurality of points forms a closed polygon. The method also includes determining a plurality of coordinate pairs, where each coordinate pair is associated with a point from the plurality of points. The method also includes retrieving user specified information for an area enclosed by the plurality of coordinate pairs.

18 Claims, 11 Drawing Sheets

SYSTEMS AND METHODS FOR GENERATING USER SPECIFIED INFORMATION FROM A MAP

FIELD

This invention relates generally to generating user-specified information, more particularly, generating user-specified information based on a map.

DESCRIPTION OF THE RELATED ART

Businesses have a need to market their products and services to potential customers. Currently, some of them rely on non-targeted advertising systems such as mass mailings to a general geographic area. However, this approach lacks the ability to target specific potential customers for specific products or services.

Alternatively, some businesses purchase previously compiled statistical data in an effort to narrow the target audience. However, the data obtained by this method is limited in that the research is typically based on small samples of the population and is typically historical data. Thus, the data is generalized and does not give the businesses any information regarding the desires or needs of specific potential customers.

Still other businesses conduct surveys through telemarketing or other types of research companies. Although telemarketing may be used to sell products and services to willing customers, this approach requires businesses to contact all potential customers without any knowledge as to the likelihood that any particular one will purchase a specific product or service.

Yet still other companies will use commercial database services such as Dialog to research potential markets. For example, a company may search these commercial database services to search for homes with average income above $50,000.00 in a zip code to determine whether it can support a particular enterprise.

The use of the databases is typically done by a user sitting in front of a computer screen inputting queries into the database. Continuing with the previous example, a user may formulate a query by typing "AVGINC=≧$50,000.00 and Zip=22104." This query will return the relevant records in the database that have an average income greater or equal to $50,000.00 within the zip code of 22104.

Although it is an efficient method of generating useful information, this method of access has its drawbacks and disadvantages. For example, many of the databases are limited in that their schema do not allow for a user to formulate a query based on geometric shapes. Moreover, these databases often include a command line interface.

SUMMARY

An embodiment relates generally to a method of generating user-specified information. The method includes selecting a plurality of points on a map, where the plurality of points forms a closed polygon. The method also includes determining a plurality of coordinate pairs, where each coordinate pair is associated with a point from the plurality of points. The method also includes retrieving user specified information for an area enclosed by the plurality of coordinate pairs.

Another embodiment pertains generally to a system for generating user specified information from a map. The system includes a map database, a second database, and a selector tool configured to interface with the map database and the second database. The selector tool further includes a user interface ("UI") module configured to interface with the map database and to accept a plurality of points on a selected map from the map database that form a closed polygon and a validation module configured to validate the plurality of points. The selector tool also includes a geometry engine configured to generate a query based on the plurality of points and a database interface configured to interface with the second database and to forward the query to the second database.

BRIEF DESCRIPTION OF THE DRAWINGS

Various features of the embodiments can be more fully appreciated, as the same become better understood with reference to the following detailed description of the embodiments when considered in connection with the accompanying figures, in which:

FIG. 5A-B, collectively, illustrate a flow diagram in accordance with yet another embodiment;

DETAILED DESCRIPTION OF EMBODIMENTS

Figure 1:
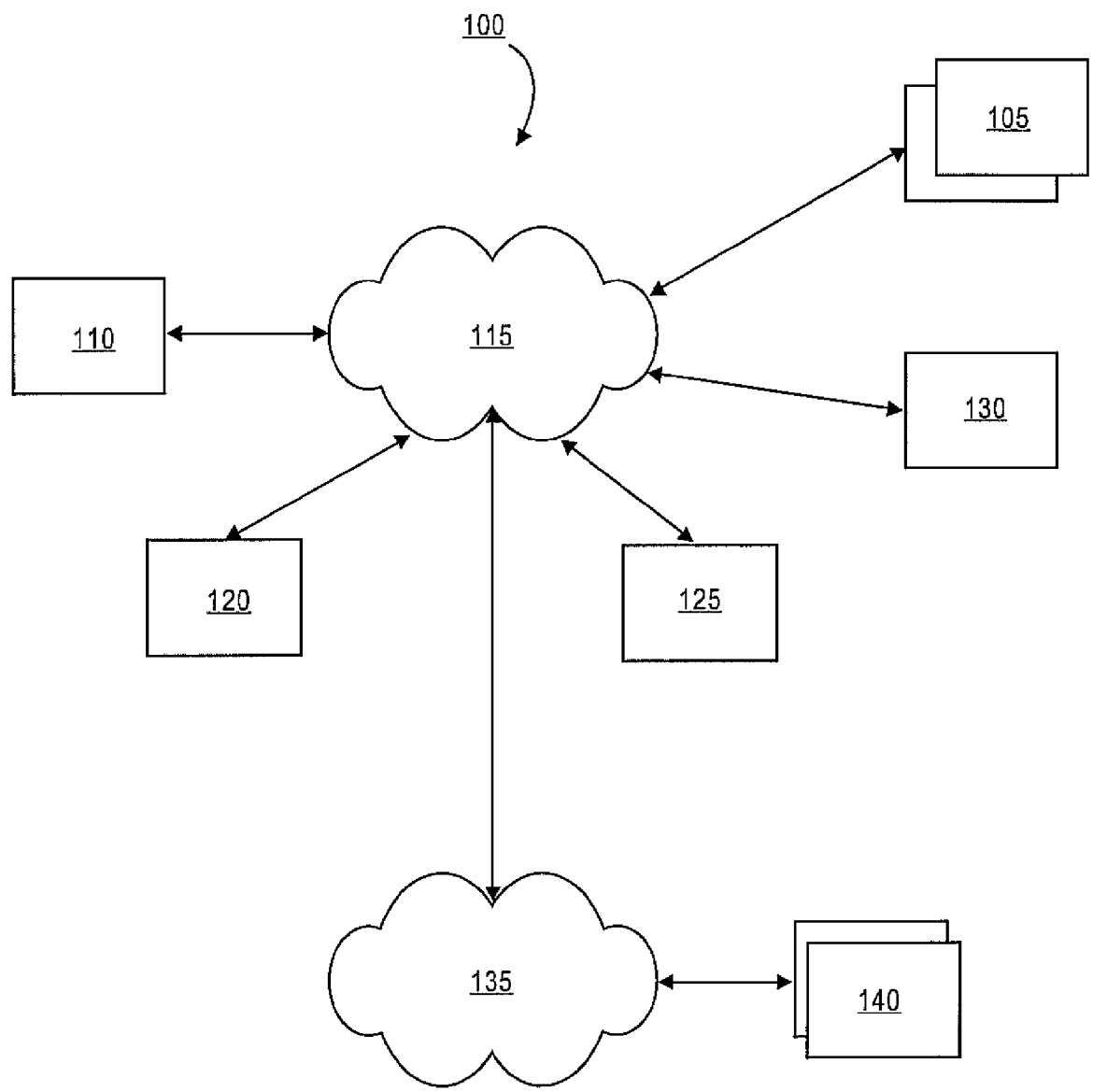
FIG. 1 illustrates an exemplary system in accordance with an embodiment.

For simplicity and illustrative purposes, the principles of the present invention are described by referring mainly to exemplary embodiments thereof. However, one of ordinary skill in the art would readily recognize that the same principles are equally applicable to, and can be implemented in, all types of computer systems that execute multiple applications, and that any such variations do not depart from the true spirit and scope of the present invention. Moreover, in the following detailed description, references are made to the accompanying figures, which illustrate specific embodiments. Electrical, mechanical, logical and structural changes may be made to the embodiments without departing from the spirit and scope of the present invention. The following detailed description is, therefore, not to be taken in a limiting sense and the scope of the present invention is defined by the appended claims and their equivalents.

Embodiments relate generally to methods, apparatus and systems for generating information based on a polygon shape selection on a map. More specifically, a map selector tool may be configured to provide a mechanism for a user to select an area on a map and collect user-specified information within the selected area. The area can be a polygon with any number of sides as long as the polygon is closed as well as a circle. The user-specified information can be any type of information as long the information can be directly or indirectly linked to a coordinate space such as geographical (latitude/longitude), Cartesian, polar, spherical, etc.

The map selector tool may be configured with a user interface (UI) module, a validation module, a geometry engine and a data interface. The UI module may be configured to provide an interface for the user to view maps and select areas within the maps to retrieve user-specified information. For example, the UI module may instantiate an object data structure to receive the latitude/longitude (lat/long) coordinates of a user selected polygon. When the polygon is completed, the UI module may transmit the object data structure containing the lat/long coordinates of the polygon to the validation module. The validation module may be configured to validate the lat/long coordinates and the number of points. The validation module may then forward the lat/long coordinates of the selected polygon to the geometry engine.

The geometry engine may be configured to generalize the selected polygon to a simple polygon, e.g., a rectangle, square, or triangle. For example, the geometry engine may determine the maximum and minimum first value of the received coordinate pairs and the maximum and minimum second value of the received coordinate pair for the selected polygon to form a four-side polygon if the number of sides of the selected polygon are greater than five. The geometry engine may then formulate a query for the user specified information based on the generalized polygon. The geometry engine may then filter the returned data against the selected polygon, i.e., for the data that does not fall within the selected polygon, to form a final data set. The geometry engine may return the user specified information to the validation module. The validation module may return the number of records within the user specified information and/or a listing of the user-specified information in response to a user request. The UI module may provide an option for the user to purchase the generated user-specified information.

FIG. 1 illustrates an exemplary system in accordance with an embodiment. It should be readily apparent to those of ordinary skill in the art that the system 100 depicted in FIG. 1 represents a generalized schematic illustration and that other components may be added or existing components may be removed or modified. Moreover, the system 100 may be implemented using software components, hardware components, or combinations thereof:

As shown in FIG. 1, system 100 includes clients 105 connected to a server 110 over a local network 115. A second server 120, a third server 125 and a fourth server 130 may also be connected to the local network 115. The clients 105 may be computing machine or platform configured to execute secure and open applications through a multi-user operating system. The clients 105 may be implemented with personal computers, workstations, thin clients, thick clients, or other similar computing platform. The clients 105 may use operating systems such as Linux, Windows, Macintosh or other available operating system. In some embodiments, the client 105 may also be implemented using mobile devices such as personal data assistants, cellular telephones, laptops or other mobile devices with a screen.

The local network 115 may be a local area network implementing an established network protocol such as Ethernet, token ring, FDDI, etc. The local network 115 provides a communication channel for the servers 110, 120-130 and clients 110 to exchange data and commands.

The servers 110, 120-130 may be a computing machine or platform configured to execute applications through a multiple user operating system (not shown) in conjunction with the clients 105. The servers 110, 120-130 may be implemented with server platforms as known to those skilled in the art from Intel, Advanced Micro Devices, Hewlett-Packard, Dell, Sun Microsystems, etc. The servers 110, 120-130 may be co-located in a single location, e.g., a data center. Alternatively, the servers 110, 120-130 may each be located in different locations.

The local network 115 may be configured to connect with the Internet 135. Within the Internet 135, application servers 140 may be provided by various entities. An example of an application server 140 may be Google.com as a portal. Other application servers 140 may provide IP telephony, domain name services, lightweight directory access protocol, etc.

Figure 2:
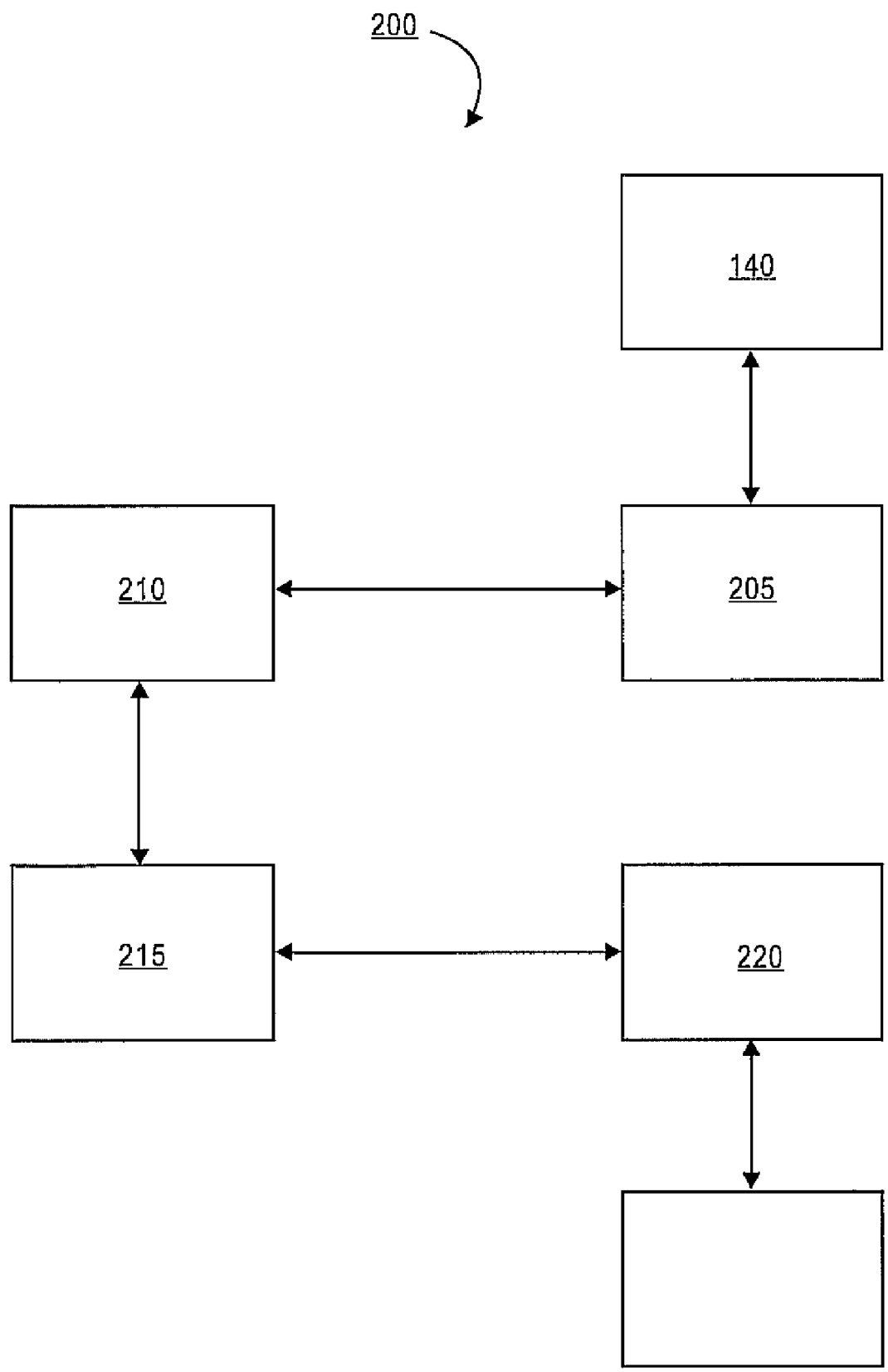
FIG. 2 illustrates an exemplary diagram of the selector tool in accordance with another embodiment.

In accordance with various embodiments, the system 100 may host and implement a selector tool 200 as shown in FIG. 2. FIG. 2 illustrates an exemplary selector tool 200 in accordance with another embodiment. It should be readily apparent to those of ordinary skill in the art that the selector tool 200 depicted in FIG. 2 represents a generalized schematic illustration and that other components may be added or existing components may be removed or modified.

As shown in FIG. 2, the selector tool 200 includes a user interface ("UI") module 205, a validation module 210, a geometry engine 215, and a database interface 220. The UI module 205 may be configured to present an interface for a user to view a map to select a user-specified area in a geometric shape, e.g. a polygon or circle, to obtain user-specified information for the selected area. The UN module 205 may determine coordinate pairs for each specified point selected on the map and store these coordinate pairs in a data structure, where the coordinate pair comprise a tuple having a first value and a second value in the coordinate space, e.g., (x,y) in Cartesian coordinate space, lat/long in geographical coordinate space, etc. The user may also provide filtering criteria in the interface to refine a data set for the user-specified information. In some embodiments, the UI module 205 may execute on the clients 110.

The UI module 205 may also interface with an application server 140 such as a mapping service. The map application server 140 provides a map database for the selector tool as well as other mapping related services. For example, the map application server 140 also provides translation services to convert (x,y) coordinates selected on a map displayed on a monitor to a coordinate space such as geographical (lat/long), polar, spherical, etc. Examples of such map application servers 140 may be MapQuest, Navteq, Google, and other similar providers.

The validation module 210 may be configured to receive a data structure that contains coordinate pairs that define a polygon or a center coordinate pair and a radius for the user-specified area and to validate the data in the data structure. The validation module 210 may also be configured to provide a temporary butfer for the requested user-specified information. After validation, the validation module may be configured to provide the data in the data structure to the geometry engine 215.

The geometry engine 215 may be configured to generalize the user-specified area to a simple polygon such as a triangle, square, or rectangle. For example, the geometry engine 215 may be configured to determine the maximum and minimum latitude and maximum and minimum longitude for a seven-sided polygon in geographical coordinate space. Accordingly, the generalized or simple polygon may be a rectangle.

The geometry engine 215 may Then be configured to formulate query based to retrieve all records within the area defined by the coordinate pairs of the simple polygon. The geometry engine 215 may submit the query to the database interface 220 to be processed by a search engine of the attached database. The attached database may be any type of database as long as the schema includes coordinate pair information for each record. The coordinate pair may be geographical, Cartesian, or other similar coordinate space.

The geometry engine 215 may also be configured to create a final data set based on the returned initial data set from the database. More specifically, the geometry engine 215 may be configured to test each record to determine whether the record falls within the received selected polygon. If the record falls within received selected polygon, the geometry engine 215 may place the record into the final data set. Moreover, either simultaneously or sequentially, the geometry engine 215 may also apply any additional filtering criteria that the user entered. Accordingly, matching records are then placed in the final data set. The geometry engine 215 may then pass the final data set to the validation module 210 to present to the user.

In some embodiments, the components or elements of the selector tool 200 may be distributed across servers. For example, the server 110 may host the UI module 205, server 120 may host the validation module 210, and the server 125 may host the geometry engine 215 and database interface 220, and server 130 may host the database 225. In other embodiments, the selector tool 200 may be hosted as a standalone system. Yet in other embodiments, the various components of the selector tool 200 may be grouped according to user design and implementation constraints.

Figure 3:
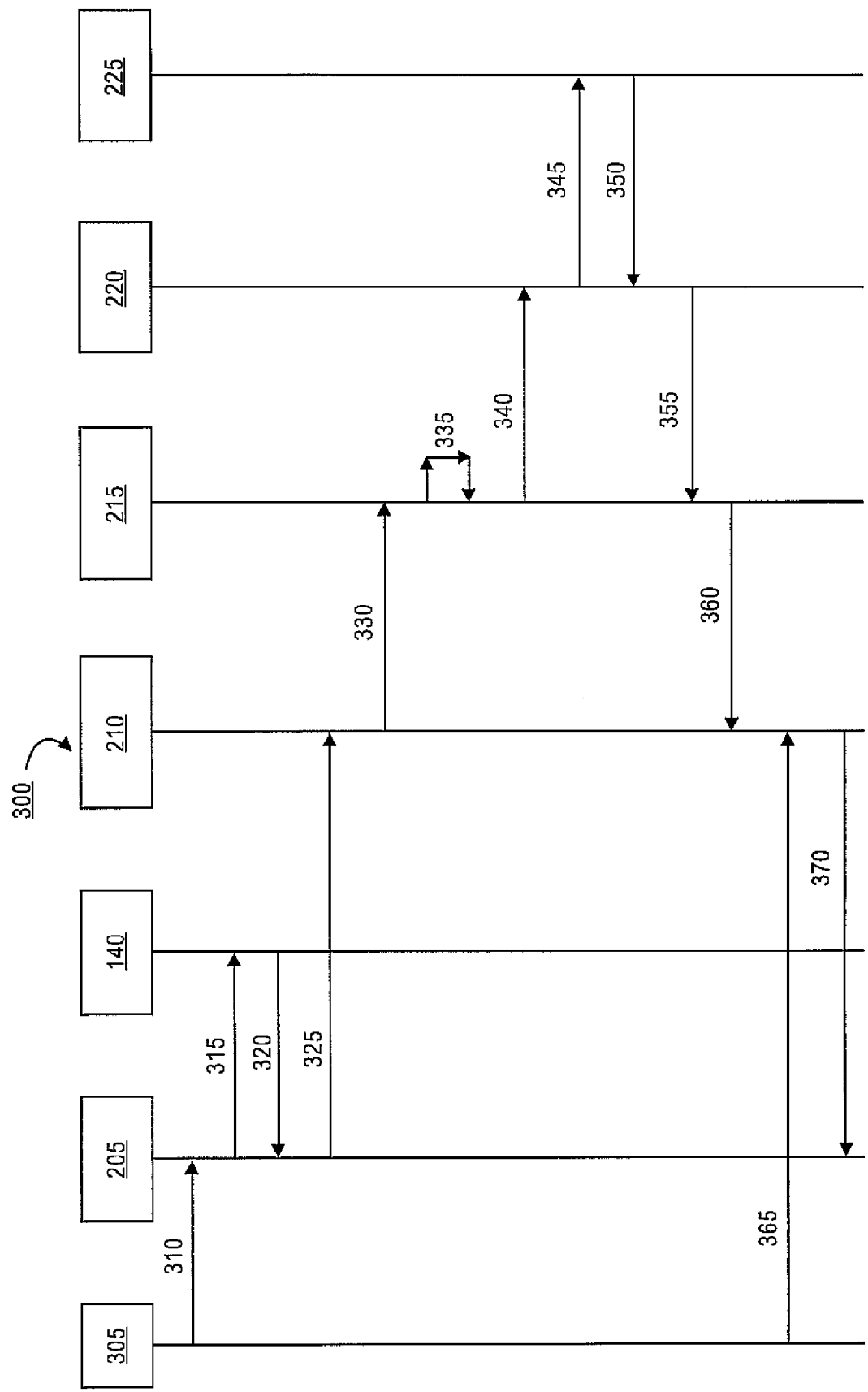
FIG. 3 illustrates an exemplary data flow diagram in accordance with yet another embodiment.

FIG. 3 illustrates a data flow 300 for the selector tool 200 in accordance with yet another embodiment. It should be readily apparent to those of ordinary skill in the art that the data flow 300 depicted in FIG. 3 represents a generalized schematic illustration and that other flows may be added or existing flows may be removed or modified.

Figure 4A:
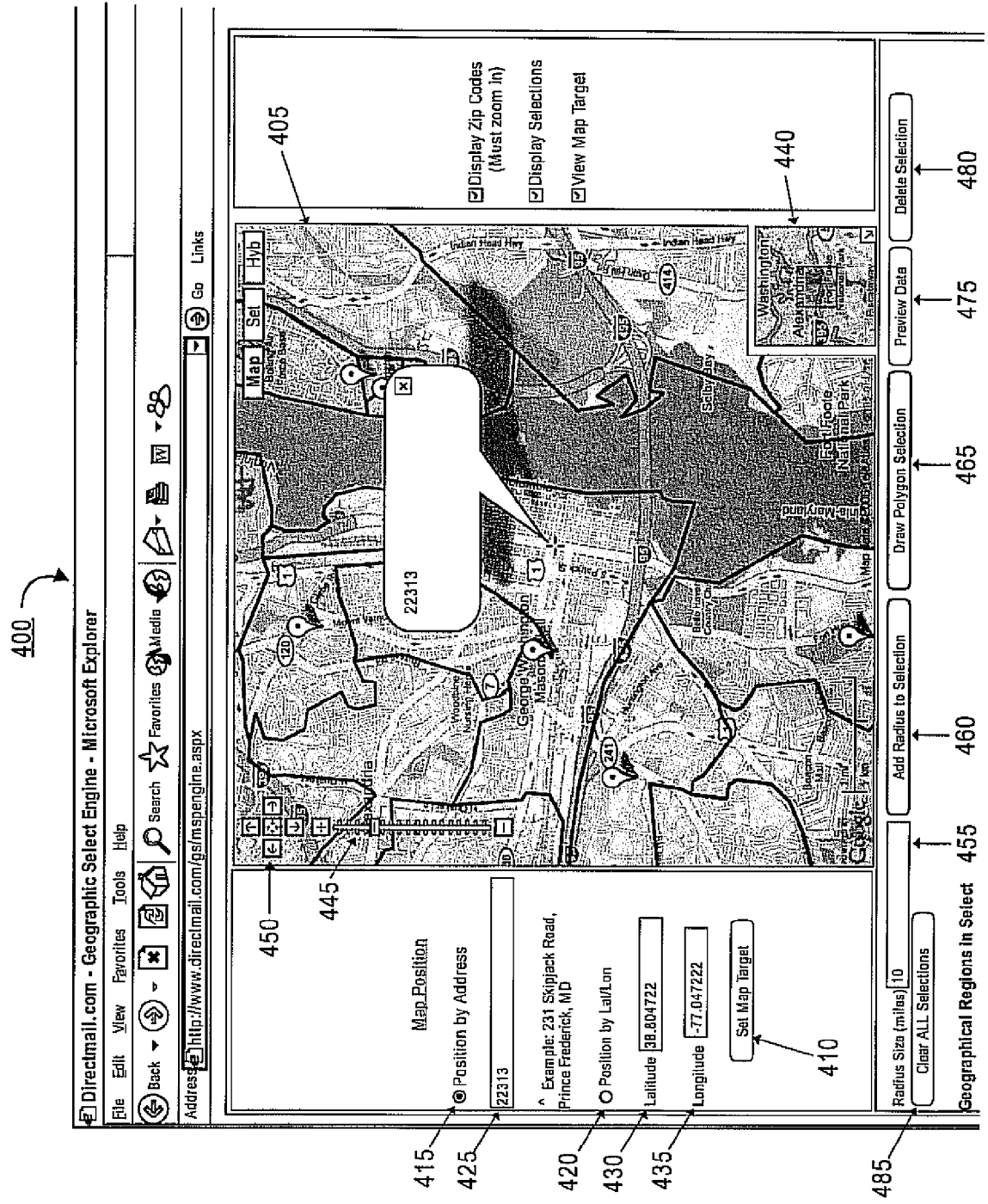
FIG. 4A illustrates an exemplary map interface in accordance with yet another embodiment.

As shown in FIG. 3, a user 305 may select points on a map being displayed on a map interface generated by the UI module 205, in step 310. More specifically, the user 305 may have previously instantiated or invoked the UI module 205 of the selector tool 200. The UI module 205 may present the map interface as shown in FIG. 4A. FIG. 4A illustrates an exemplary map interface 400 for the UI module 205 in accordance with yet another embodiment. It should be readily apparent to those skilled in the art that the map interface 400 depicted in FIG. 4A represents a generalized schematic illustration and that other components may be added or existing components may be removed or modified. Moreover, the map interface 400 and its functionality may be implemented using HTML, XML, Java, C, C++ or other programming languages.

As shown in FIG. 4A, the map interface 400 may have a map field 405, where selected maps may be displayed. The displayed map may be selected by using a "Set Map Target" button 410. When a user activates the button 410, the UI module 205 may display a list of maps from which a user can select therefrom.

In some embodiments, overlays may be displayed on a selected map. More particularly, a user may select an overlay based on, but not limited to, zip codes, school districts, voting districts or a selected field in a database schema. The data for overlays may be stored in a database, such as database 225. The overlay data comprises a number of points defined in a coordinate space, e.g., geographical coordinates (lat/long). The points are stored with an associated point number, which allows the points to be retrieved in the order they are traced around a geographical area.

The overlay data may then be read and converted into an XML data stream by the validation module 210. The XML data is then passed to the UI module 205, where the data is parsed and converted to (x,y) coordinates of the user's screen based on the current map position. Line can then be drawn between the points through standard API calls allowing a user to see the overlay, The map interface 400 may also include a mechanism to center the selected map. More particularly, the map interface includes a position by address button 415 and a position by latitude/longitude (lat/long) button 420. When a user activates button 415, the user may enter an address or parts of an address in the address field 425. Similarly, when a user activates button 420, the user may enter latitude information into the latitude field 430 and longitude information in the longitude field 435.

The map interface 400 may further include a map inset 440, which displays a higher elevation view of the selected map. An altitude bar 445 and scroll buttons 450 may also be provided on the map interface. The altitude bar 445 may allow a user to zoom-in or zoom-out a displayed map. The scroll buttons 450 allow a user to browse through the selected map by activating the appropriate scroll button 450.

The map interface 400 may be configured to allow user to select a circle around a position with a user specified radius. More particularly, a user may enter position either by address or lat/long and then enter a radius value into the radius size field 455. When the user activates "Add Radius to Selection" button 460, a scaled circle appears on the displayed map centered by the entered position. Subsequently, the user may request user-specified information within the selected circle.

Figure 4B:
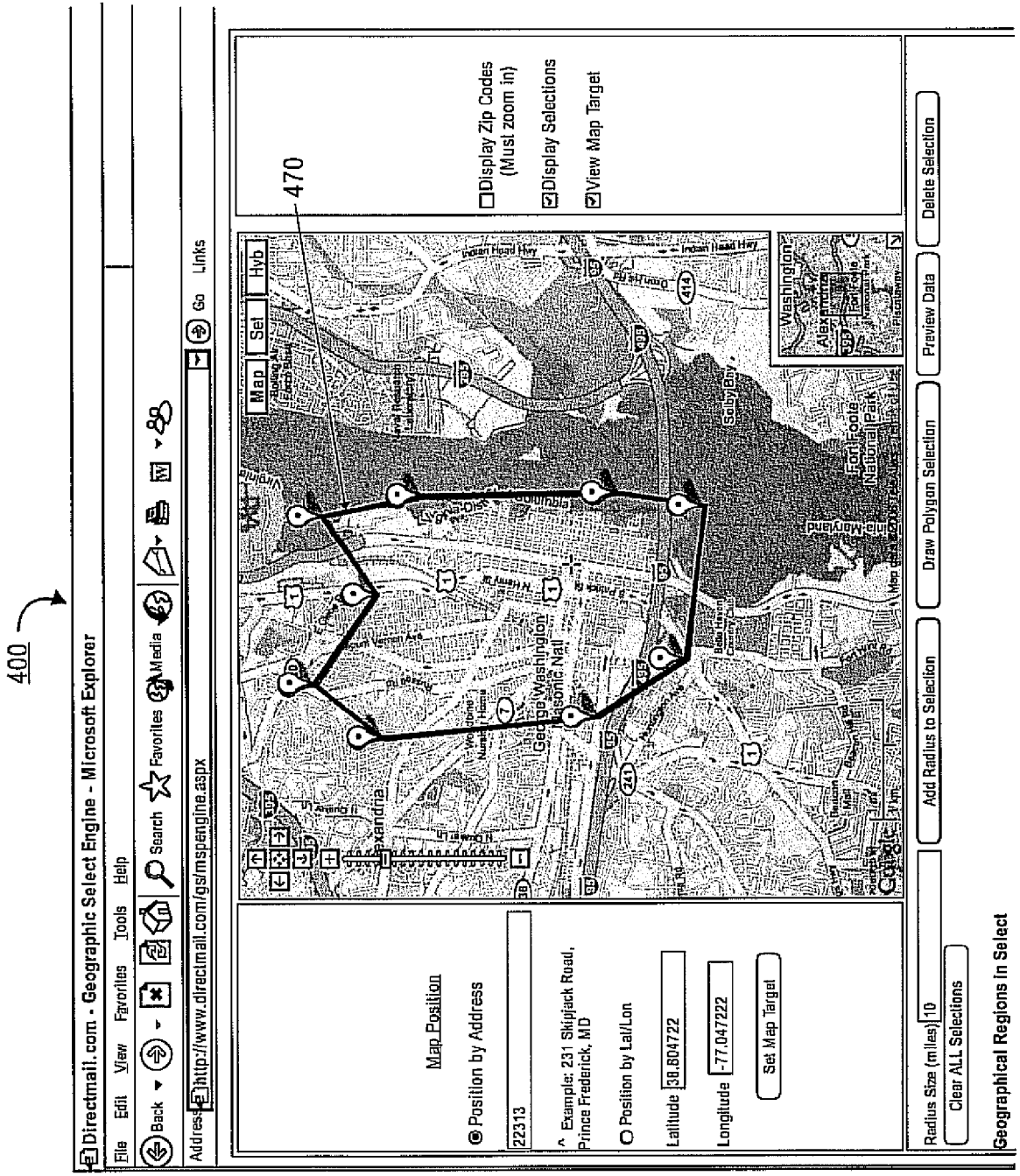
FIG. 4B illustrates the same map interface of FIG. 4A with a polygon.

The map interface 400 may also be configured to allow a user to draw a polygon to request user specified information within the drawn polygon. More particularly, when a user activates the "Draw Polygon Selection" button 465, the map interface 400 may be configured to permit a user to draw polygons on the displayed map in the map field 405. FIG. 4B illustrates an example of a nine-sided polygon 470. Subsequently, the user may request user-specified information within the polygon 470.

Returning, to FIG. 4A, a user may request a preview of the final data set of the user-specified information from either the radius or polygon query by activating the preview data button 475.

A user may clear a current drawing object, either circle or polygon, by activating the "Delete Selection" button 480. A user may also clear all fields by activating the "Clear All Selections" button 485.

Returning to FIG. 3, in step 315, the UI module 205 may determine a coordinate pair for a received point. More particularly, the UI module 205 may initiate a call to return a coordinate pair for the received point. The UI module 205 may send the (x,y) coordinate of the received point to an application server 140 to translate the (x,y) coordinate of the received point into a coordinate pair, where the coordinate pair may be geographical coordinate space. An example of providers of this type of application service may be MapQuest, Google, Navteq, Microsoft, RandMcNally, etc. It should be readily obvious to those of ordinary skill that embodiments of this invention are not limited to latitude/longitude coordinate space. Other coordinate spaces such as Cartesian coordinate space may be used without departing from the scope and/or spirit of these embodiments.

In step 320, the mapping service 140 may return the coordinate pair to the UI module 205. The UI module 205 may store the coordinate pair in an object data structure that was instantiated during invocation. The UI module 205 may also be configured to draw lines between the selected points on the displayed map.

In step 325, after the UI module 205 determines that the last selected point has closed the polygon, i.e., the last selected point is the same as the first selected point, the UI module 205 may transmit a message to the validation module 210. The message may contain the coordinate pairs that comprise the polygon as well as the number of points that define the polygon.

When the validation module 210 receives the message, the validation module 210 may be configured to validate the coordinate pairs. More specifically, the validation module 210 determines whether the message contains the correct number of points as transmitted by the UI module 205. The UI module 205 may include a field that indicates the number of coordinate pair points. The validation module 210 may also determine whether each coordinate pair is a valid coordinate pair. For example, if the coordinate space is geographical coordinate space, the validation module 210 may validate the values are numerical values, have the appropriate mathematical sign for the geographical area, and the points are within the area set by the system administrator.

After validation, the validation module may transmit the validated coordinate pairs to the geometry engine 215, in step 330. The geometry engine 215 may then be configured to generalize the received polygon. More specifically, the geometry engine 215 may determine a simple polygon or generalized polygon from the received polygon. In one embodiment, the geometry engine 215 may determine the maximum and minimum latitude and maximum and minimum longitude coordinate pairs of the received coordinate pairs. This may result in a simple polygon such as a triangle, square, or rectangle. The geometry engine 215 may then formulate a query to a database requesting records that have coordinate pair information falling within the simple polygon defined by the maximum and minimum latitude and maximum and minimum longitude coordinate pairs of the received coordinate pairs.

In step 340, the geometry engine 215 may submit the query to the database interface 220. In step 345, the database interface 220 may validate the query and submit a validated query to a search engine of the database 225. As previously noted, the database 225 may be any type of commercial database, non-commercial database or combination thereof as long as the schema includes the coordinate pair within each record.

In step 350, the database 225 may return the search results to the database interface 220 to return to the geometry engine 215, in step 355. The geometry engine 215 may be configured to refine the initial search results. More particularly, the geometry engine may test each record from the initial search results to determine whether the record falls within the received polygon. If the selected record is within the received polygon, the selected record is added to a final data set. In some embodiments, the user may also have inputted additional filtering criteria into the interface of the UI module 205. The geometry engine 215 may substantially simultaneously or subsequently test the additional filtering criteria against the initial search results.

In step 360, the geometry engine 215 may forward the final data set to the validation module 210, where the final data set is cached. In step 365, the user may request either a record count of the final data set and/or a listing preview of the final data set. In step 370, the validation module 210 returns the requested information to the UI module 205 for the user to view. In other embodiments, the user may have an option to purchase the final data set.

Figure 5A:
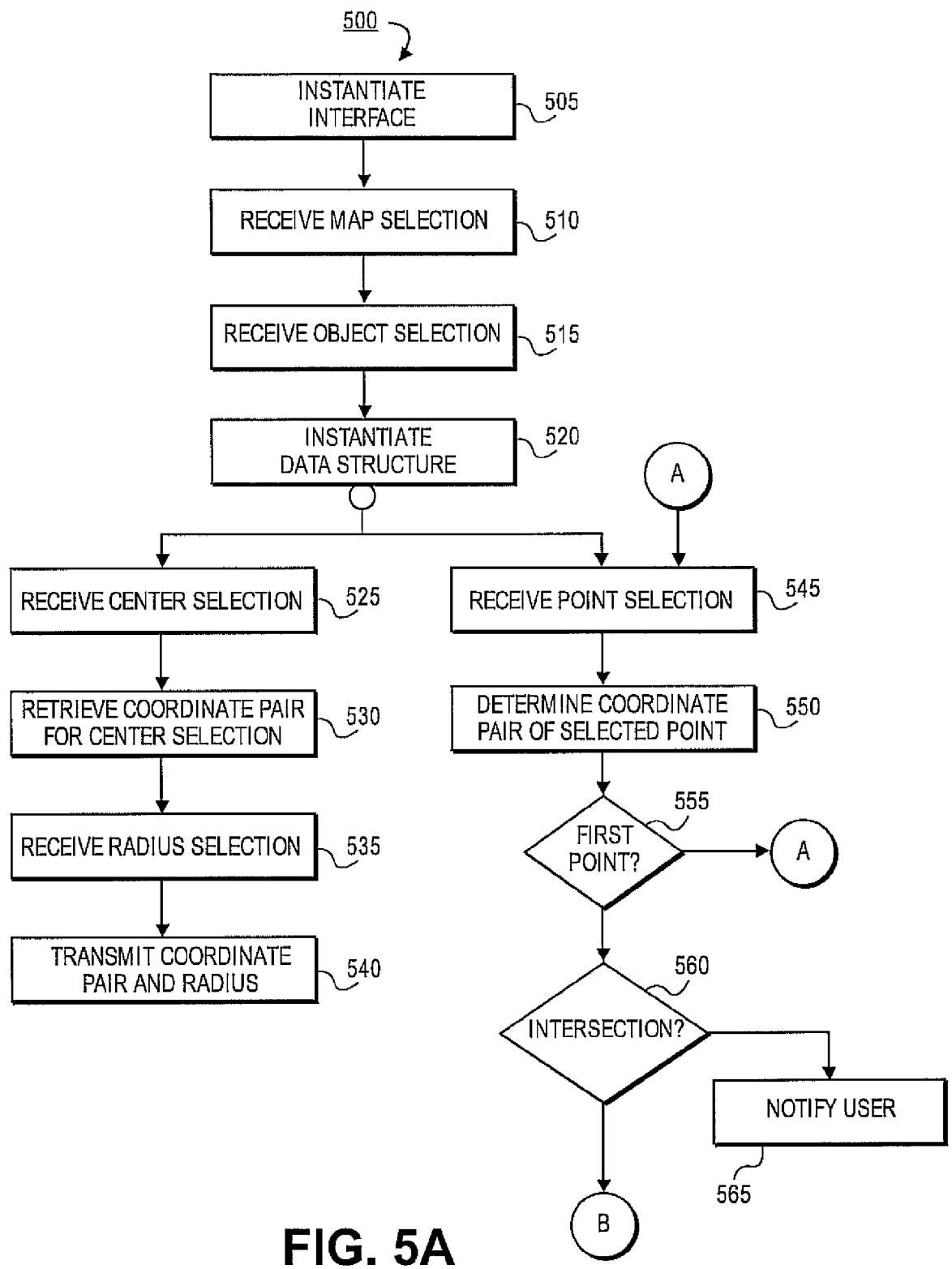
Figure 5:
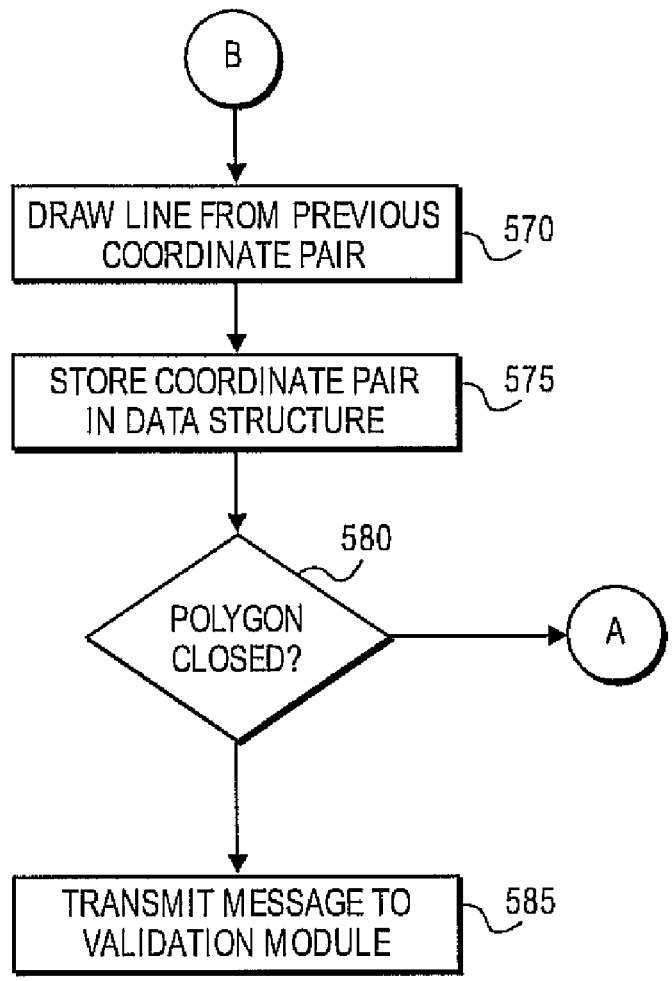
FIG. 5 is a key to FIGS. 5A-B.
Figure 5:
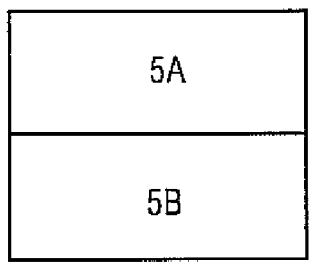

FIG. 5 is a key to FIGS. 5A-B, which collectively illustrate a flow diagram 500 implemented by the UI module 205 in accordance with yet another embodiment. It should be readily apparent to those of ordinary skill in the art that the flow diagram 500 depicted in FIGS. 5A-B represents a generalized schematic illustration and that other steps may be added or existing steps may be removed or modified.

As shown in FIG. 5A, the Up module 205 may display an interface 400 as previously described with FIG. 4A in response to being invoked by a user on a client 105, in step 505. The UI module 205 may enter an idle state waiting for user input.

In step 510, the user may select a map to be displayed. More particularly, the map interface 400 may be displayed in response to the UI module 205 being activated. The user may select a map by activating the "Set Map Target" button 410.

In step 515, the user may select the type of shape to be drawn on the displayed map. The map interface 400 provides a mechanism for a user to select a circle with a user specified radius as well as polygon to be drawn on the displayed map. In step 520, the UI module 205 may instantiate an object data structure to store data/information related to the drawn object.

For a circle object, the UI module 205 may receive the center either by the address field 425, the lat/long field 430, 435 or a mouse selection as specified by the user, in step 530. The UI module 205 may be configured to translate the selected point into a coordinate pair. In some embodiments, the UI module 205 may pass the (x,y) coordinate of the selected point based on the monitor to an application server, e.g., a mapping service 140, to retrieve a lat/long coordinate pair. In step 535, the UI module may receive the user-specified radius from the radius field 445. The UI module 205 may be store the coordinate pair of the center of the circle along with the radius in the object data structure, where the object data structure is then passed to the validation module 210, in step 540.

For a polygon selection, the UI module 205 may be configured to receive the (x,y) coordinate of a selected point on the displayed map in the map interface 400, in step 545. The UI module 205 may pass the (x,y) coordinate to a mapping service, e.g., mapping service 140, to obtain the lat/long coordinates of the selected point, in step 550.

The UI module 205 may then be configured to determine whether the selected point (in lat/long coordinate space) is the first point, in step 555. If the selected point is the first point, the selected point is stored in the object data structure indexed by a position within the polygon. For example, if the selected point is the first point, the index value may be set to one or zero. Subsequently, the UI module 205 may return to an idle state to wait for the next selection of a point on the display map in step 545.

Otherwise, if the selected point is not the first point, the UI module 205 may be configured to determine whether the selected point forms a line from the previous point that intersects with any previous lines, in step 560. Algorithms for determining line intersection are known to those skilled in the art such as T. Cormen et at, *Introduction to Algorithms*, MIT Press, Cambridge, Mass., 1990; U. Manber, *Introduction to Algorithins* Addison-Wesley, Reading, Mass., 1989; and J. Nievergelt et al, *Algorithms and Data Structures With Applications To Graphics And Geometry*, Prentice Hall, Englewood Cliffs, N.J., 1993; which are incorporated by reference in their entirety.

If the selected point intersects a previous line, the UI module 205 may notify the user to select a different position and discard the selected point, in step 565. The UI module 205 may enter an idle state and proceed to step 545.

Otherwise, if the selected point does not intersect any other previous lines of the polygon, turning to FIG. 5B, the UT module 205 may draw line between the selected point and the previous point, in step 570. More particularly, many map application program interface typically include a function that allows line drawing between two points as known to those skilled in the art.

In step 575, either substantially simultaneously or sequentially, the UI module may be configured to store the selected point in coordinate space into the object data structure indexed by its position in the polygon.

In step 580, the UI module 205 determines whether the polygon was closed by the selected point, More particularly, the UI module 205 checks whether the selected point matches the first point and the position index is greater than 2. If the selected point does not close the polygon, the UI module 205 may enter an idle state and proceed to step 545 (see FIG. 5A) to wait for the next selected point.

Otherwise, the UI module 205 may formulate a message to the validation message that includes the coordinate pair information of the selected points of the polygon, the number of points in the polygon, and any filtering criteria entered by the user, in step 585.

Figure 6:
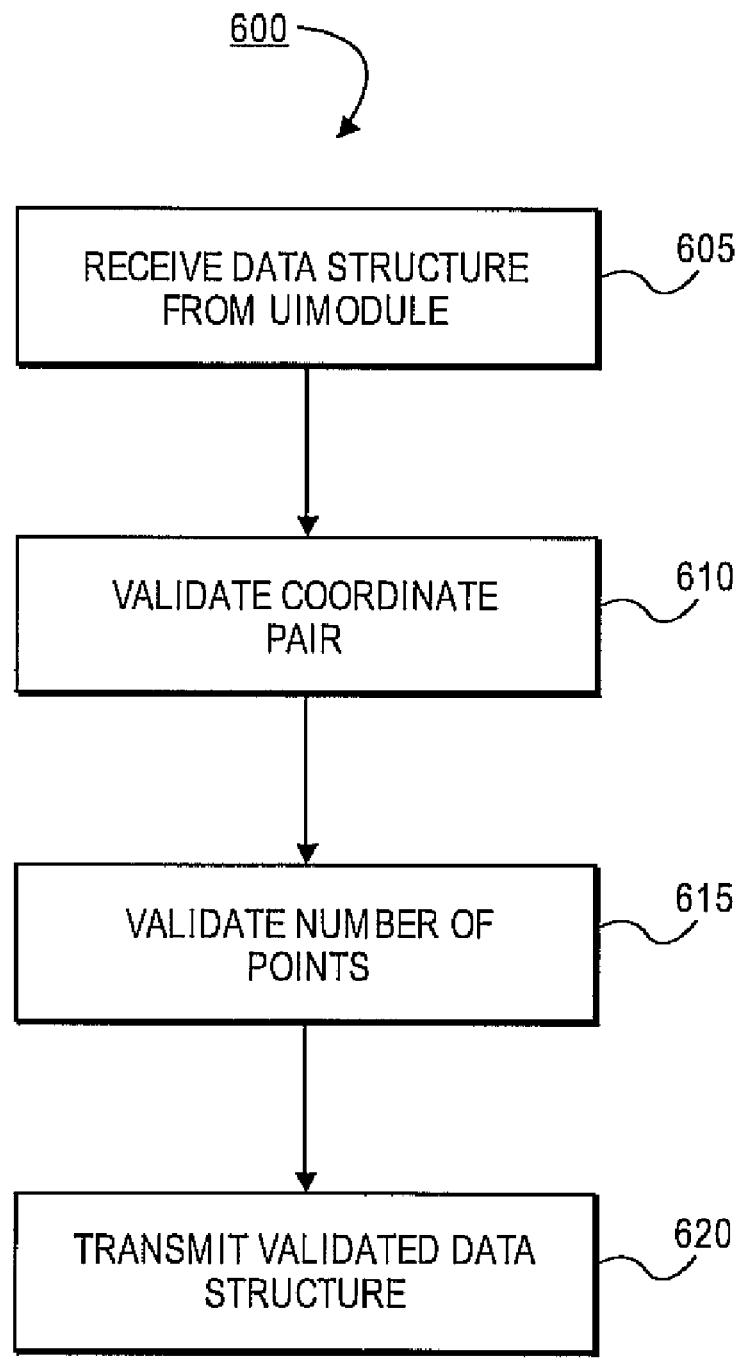
FIG. 6 illustrates another flow diagram in accordance with yet another embodiment.

FIG. 6 illustrates a flow diagram 600 implemented by the validation module 210 in accordance with yet another embodiment. It should be readily apparent to those of ordinary skill in the art that the flow diagram 600 depicted in FIG. 6 represents a generalized schematic illustration and that other steps may be added or existing steps may be removed or modified. Moreover, the flow diagram 600 may be implemented using HTML, XML, Java, C, C++ or other programming languages.

As shown by FIG. 6, the validation module 210 may be configured to retrieve the object data structure from the received message from the UI module 205, in step 605. The validation module 210 may be configured to validate the coordinate pairs, in step 610. More particularly, the validation module 210 may test whether each coordinate pair as a valid value for the respective coordinate space. For example, if the coordinate pair is a lat/long coordinate pair, the validation module 210 may test whether the value conforms to lat/long specifications as well as being valid. If the coordinate pairs are not valid, the validation module 210 may notify the user to correct the data.

In step 615, the validation module 210 may determine the number of coordinate pairs matches the highest value of the index of positions. If there is not a match, the validation module 210 may return a message to the user to correct the problem. Once the coordinate pairs are validated, the validation module 210 may transmit the validated coordinate pairs in the data structure as well as any filtering criteria to the geometry engine 215.

Figure 7:
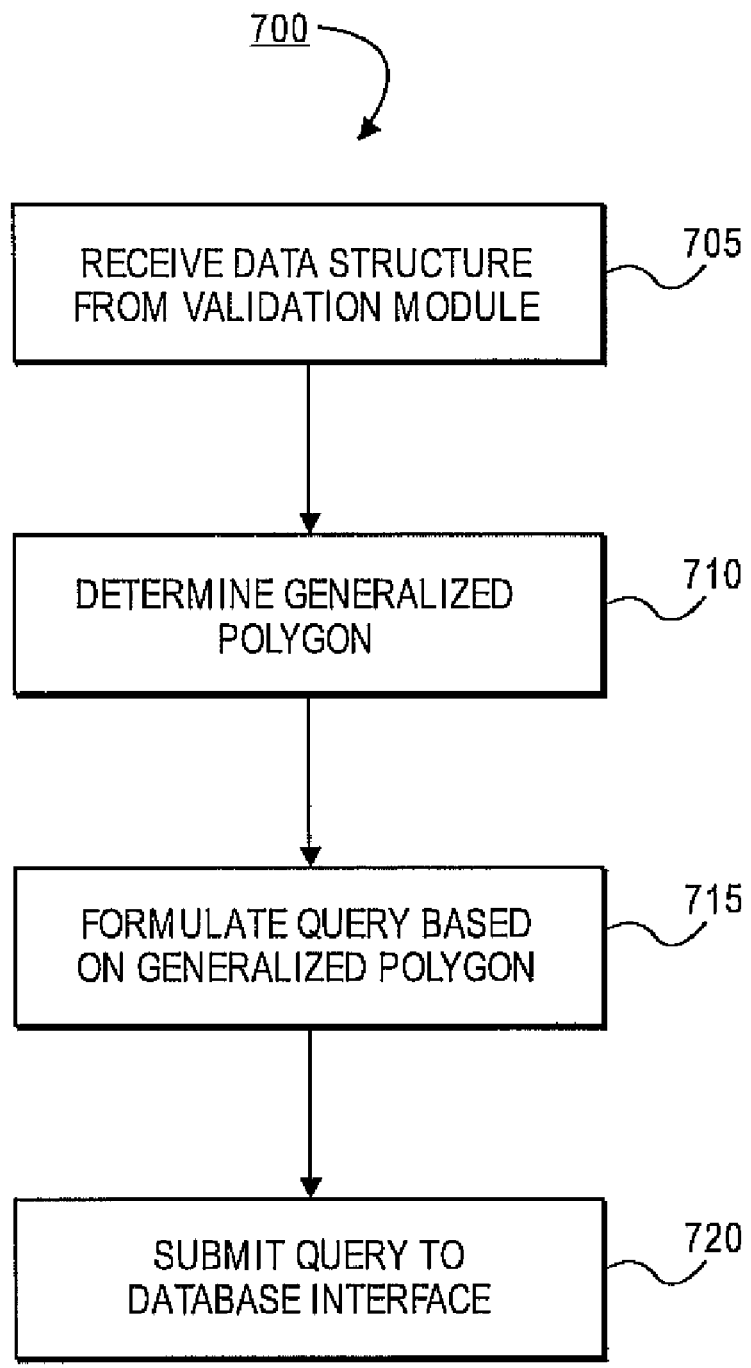
FIG. 7 illustrates yet another flow diagram in accordance with yet another embodiment.

FIG. 7 illustrates a flow diagram 700 implemented by the geometry engine 215 in accordance with yet another embodiment. It should be readily apparent to those of ordinary skill in the art that the flow diagram 700 depicted in FIG. 7 represents a generalized schematic illustration and that other steps may be added or existing steps may be removed or modified. Moreover, the flow diagram 700 may be implemented using HTML, XML, Java, C, C++ or other programming languages.

As shown in FIG. 7, the geometry engine 215 may be configured to receive the validated coordinate pairs from the validation module 210 and any filtering criteria, in step 705. In step 710, the geometry engine 215 may be configured to generalize the received polygon into a simple polygon such as a triangle, square or rectangle. More specifically, the geometry engine 215 may be configured to determine the maximum and minimum value of the first coordinate value and the maximum and minimum value of the second coordinate value of the array of coordinate pairs. For example, in the case of the nine-sided polygon 470 shown in FIG. 4B, the generalized polygon is a rectangle.

In step 715, the geometry engine 215 may be configured to formulate a query based on the coordinate pairs of the generalized or simple polygon. More specifically, the query may request all the records bound by the simple polygon as defined by the coordinate pairs. Subsequently, the geometry engine 215 may submit the query to the database interface 220 to retrieve an initial set of search results, in step 720.

Figure 8:
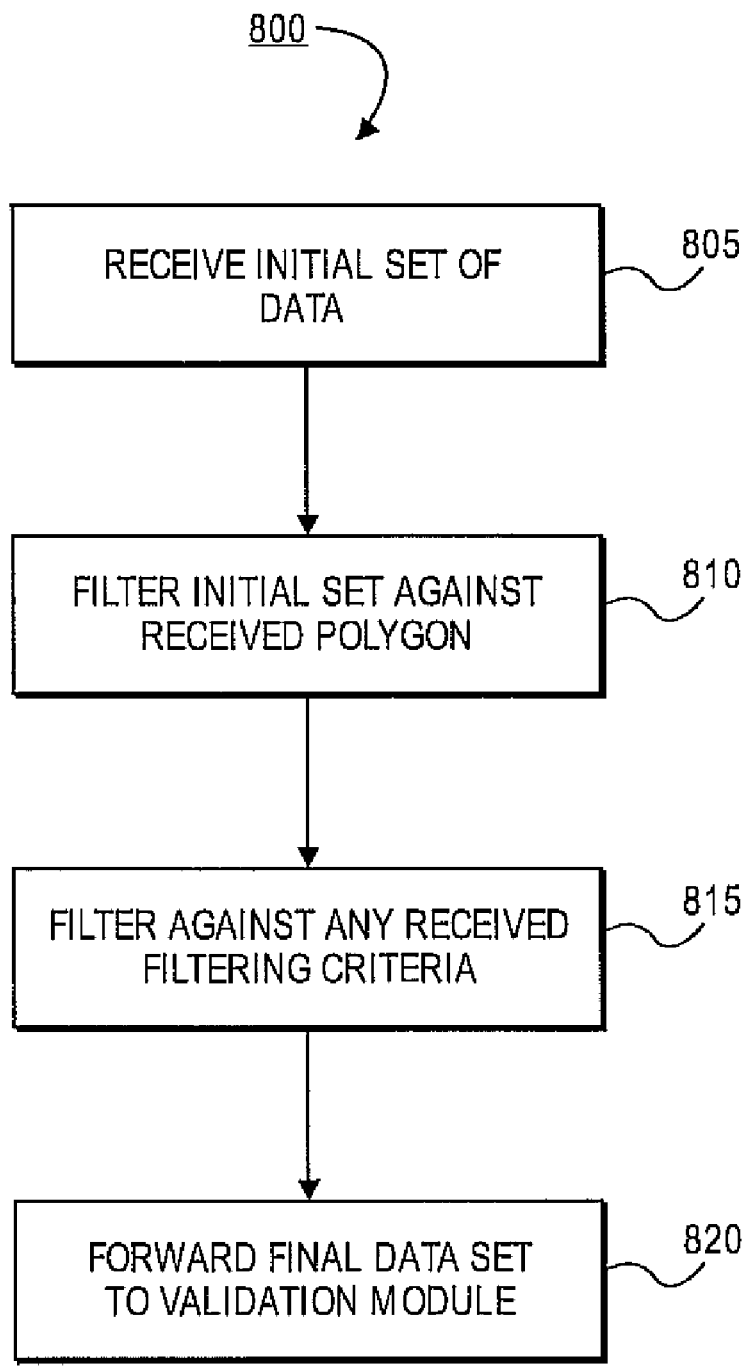
FIG. 8 illustrates yet another flow diagram in accordance with yet another embodiment.

FIG. 8 illustrates another flow diagram 800 implemented by the geometry engine 215. It should be readily apparent to those of ordinary skill in the art that the flow diagram 800 depicted in FIG. 8 represents a generalized schematic illustration and that other steps may be added or existing steps may be removed or modified.

As shown in FIG. 8, the geometry engine 215 may receive an initial set of data from the database, e.g., database 225, in step 805. The geometry engine 215 may then filter or sort the initial set of data against the received polygon, in step 810. More specifically, the geometry engine 215 may check each record from the initial set of data to see if the associated coordinate pair of the record falls within the received polygon. Algorithms to determine the location of a point within a specified area are known to those skilled in the art such as D. R. Finley, *Point-in-Polygon Algorithm—Determining Whether a Point Is Inside a Complex Polygon*, (www://alienryderflex.com/polygon) 1998, which is hereby incorporated by reference in its entirety. If a selected record falls within the selected polygon, the geometry engine 215 places the record in a temporary data set.

In step 815, substantially simultaneously as step 810, or subsequently thereafter, the geometry engine 215 may also filter the temporary data set against any filtering criteria entered by the user. For example, a user may want to further limit a list of user specified information for income levels greater than $50,000.00, in single family homes, and family size greater than four. Subsequently, in step 820, the final set of data is then forwarded to the validation module 210 by the geometry engine 215.

Figure 9:
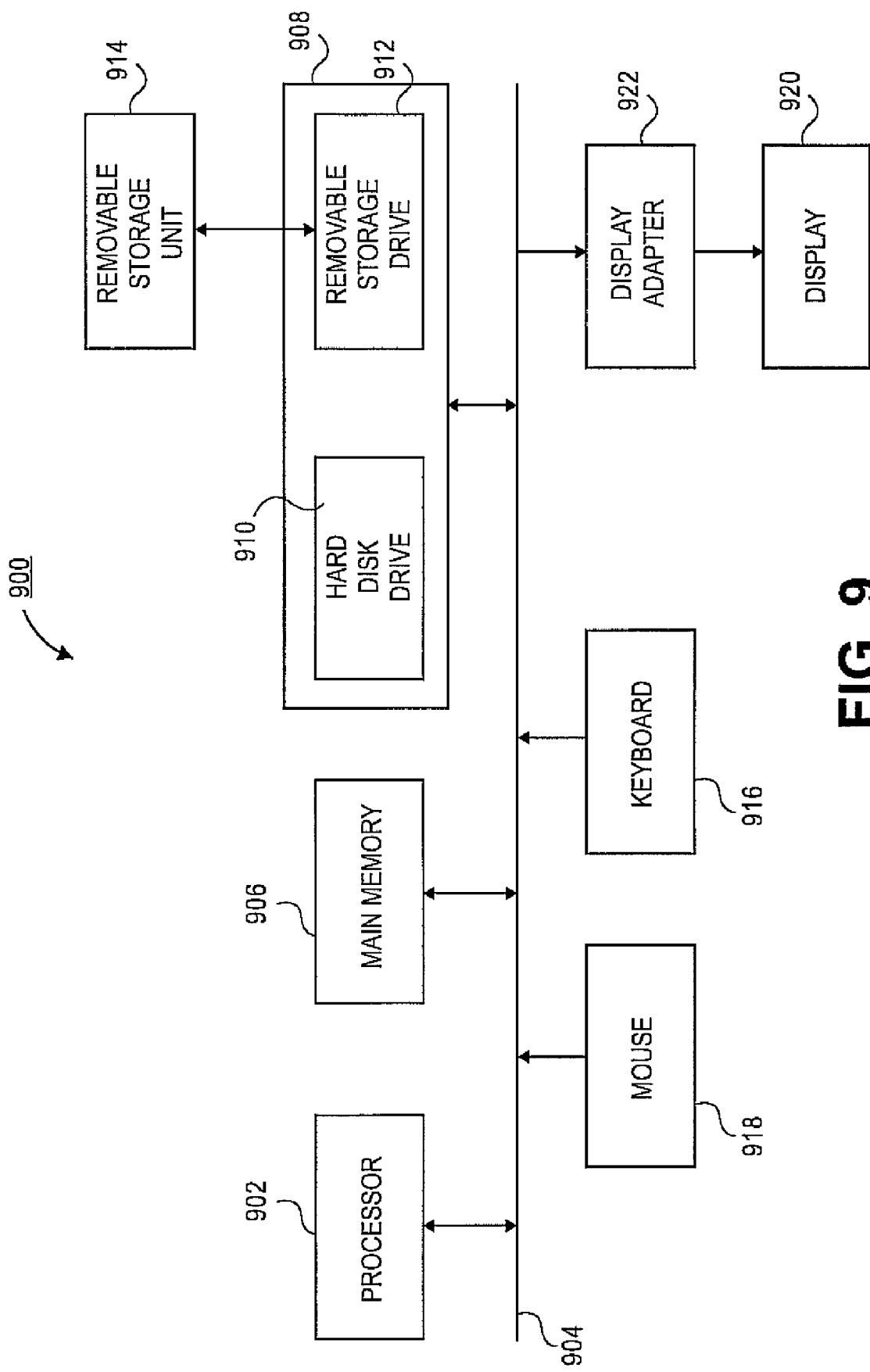
FIG. 9 illustrates an exemplary computing platform.

FIG. 9 illustrates an exemplary block diagram of a computing platform 900 where an embodiment may be practiced. The functions of the security client and certificate management system may be implemented in program code and executed by the computing platform 900. The security client and certificate management system may be implemented in computer languages such as PASCAL, C, C++, JAVA, etc.

As shown in FIG. 9, the computer system 900 includes one or more processors, such as processor 902 that provide an execution platform for embodiments of the selector tool. Commands and data from the processor 902 are communicated over a communication bus 904. The computer system 900 also includes a main memory 906, such as a Random Access Memory (RAM), where the selector tool may be executed during runtime, and a secondary memory 908. The secondary memory 908 includes, for example, a hard disk drive 910 and/or a removable storage drive 912, representing a floppy diskette drive, a magnetic tape drive, a compact disk drive, etc., where a copy of a computer program embodiment for the selector tool may be stored. The removable storage drive 912 reads from and/or writes to a removable storage unit 914 in a well-known manner. A user interfaces with the selector tool with a keyboard 916, a mouse 918, and a display 920. A display adapter 922 interfaces with the communication bus 904 and the display 920. The display adapter also receives display data from the processor 902 and converts the display data into display commands for the display 920.

Certain embodiments may be performed as a computer program. The computer program may exist in a variety of forms both active and inactive. For example, the computer program can exist as software program(s) comprised of program instructions in source code, object code, executable code or other formats; firmware program(s); or hardware description language (HDL) files. Any of the above can be embodied on a computer readable medium, which include storage devices and signals, in compressed or uncompressed form. Exemplary computer readable storage devices include conventional computer system RAM (random access memory), ROM (read-only memory), EPROM (erasable, programmable ROM), EEPROM (electrically erasable, programmable ROM), and magnetic or optical disks or tapes. Exemplary computer readable signals, whether modulated using a carrier or not, are signals that a computer system hosting or running the present invention can be configured to access, including signals downloaded through the Internet or other networks. Concrete examples of the foregoing include distribution of executable software program(s) of the computer program on a CD-ROM or via Internet download. In a sense, the Internet itself, as an abstract entity, is a computer readable medium. The same is true of computer networks in general.

While the invention has been described with reference to the exemplary embodiments thereof, those skilled in the art will be able to make various modifications to the described embodiments without departing from the true spirit and scope. The terms and descriptions used herein are set forth by way of illustration only and are not meant as limitations. In particular, although the method has been described by examples, the steps of the method may be performed in a different order than illustrated or simultaneously. Those skilled in the art will recognize that these and other variations are possible within the spirit and scope as defined in the following claims and their equivalents.

What is claimed is:

1. A method of generating user-specified information, the method comprising:
    receiving a plurality of points selected on a map, the plurality of points forming a closed polygon;
    determining a plurality of coordinate pairs, each coordinate pair associated with a point from the plurality of points;
    determining a generalized polygon based on the plurality of coordinate pairs;
    forming a query based on the generalized polygon; and
    retrieving, by a processor, user specified information for an area enclosed by the plurality of coordinate pairs, wherein the processor receives a data set generated based on the query and filters the data set against the plurality of coordinate pairs to form the user specified information.

2. The method of claim 1, further comprising providing one of a count of records in the user specified information and a listing of records in the user specified information in response to a user request.

3. The method of claim 1, further comprising instantiating a data structure to store the plurality of coordinate pairs.

4. The method of claim 1, further comprising determining whether a current line formed by each point and a previous point intersects with a previously created line.

5. The method of claim 4, further comprising notifying a user of an invalid polygon in response to an intersection of the current line with the previously created line.

6. The method of claim 1, further comprising determining whether a current point of the plurality of points completes the closed polygon.

7. The method of claim 1, wherein the user specified information is a filtered list.

8. The method of claim 1, wherein the coordinate pair is one of a latitude/longitude pair and a Cartesian pair.

9. An apparatus comprising means to implement the method of claim 1.

10. A computer-readable storage medium comprising computer-executable instructions for performing the method of claim 1.

11. A system for generating user specified information from a map, the system comprising:
    a map database;
    a second database; and
    a selector tool configured to interface with the map database and the second database, wherein the selector tool further comprises:
        a user interface ("UI") module configured to interface with the map database, to accept a plurality of points on a selected map from the map database that form a closed polygon, to convert each point of the plurality of points into a respective coordinate pair, and to store the coordinate pairs in a data structure;
        a validation module configured to validate the plurality of points;
        a geometry engine configured to generate a query based on the plurality of points, wherein the geometry engine is configured to determine a generalized polygon based on the coordinate pairs and to generate the query based on the generalized polygon; and
        a database interface configured to interface with the second database and to forward the query to the second database, wherein
        the geometry engine is further configured to issue the query to the database interface, to receive a data set based on the query from the second database, and to filter the received data set against the coordinate pairs to form a requested data set.

12. The system of claim 11, wherein the UI module is further configured to determine a current line formed by a current point and an immediate preceding point intersects with a previously created line.

13. The system of claim 12, wherein the UI module is further configured to notify a user of an invalid polygon in response to an intersection of the current line with the previously created line.

14. The system of claim 13, wherein the UI module is further configured to determine whether a current point of the plurality of points completes the closed polygon.

15. The system of claim 11, wherein the validation module is configured to validate the coordinate pairs and the number of points.

16. The system of claim 11, wherein the validation module is hinter configured to provide one of a count of records in the requested data set and a listing of records in the requested data set in response to a user request.

17. The system of claim 11, wherein the UI module, the validation module, the geometry engine and the database interface are located in separate locations.

18. The system of claim 11 wherein the UI module, the validation module, the geometry engine and the database interface are co-located.

* * * * *